(12) United States Patent
Leske et al.

(10) Patent No.: US 6,866,346 B2
(45) Date of Patent: Mar. 15, 2005

(54) ACTUATING DEVICE FOR A BRAKE UNIT OF AN ELECTRONICALLY CONTROLLED VEHICLE BRAKE SYSTEM

(75) Inventors: Olaf Leske, Langenhagen (DE); Bernd Christoffers, Wennigsen (DE)

(73) Assignee: WABCO GmbH & Co. oHG, Hannover (DE)

(*) Notice: Subject to any disclaimer, the term of this patent is extended or adjusted under 35 U.S.C. 154(b) by 0 days.

(21) Appl. No.: 10/453,855

(22) Filed: Jun. 3, 2003

(65) Prior Publication Data

US 2004/0045777 A1 Mar. 11, 2004

(30) Foreign Application Priority Data

Jun. 5, 2002 (DE) .......................... 102 24 806

(51) Int. Cl.⁷ ............................................. B60T 15/02
(52) U.S. Cl. ........................... 303/40; 303/15; 303/20; 303/50; 188/156; 137/627.5
(58) Field of Search ................ 303/3, 15, 20, 303/40, 50, 118.1, 113.4; 188/156, 158, 72.1, 106 P; 91/369.1, 367, 376 R; 60/534, 545; 74/512, 514; 137/115.19, 627.5

(56) References Cited

U.S. PATENT DOCUMENTS

| | | | | |
|---|---|---|---|---|
| 3,937,527 A | * | 2/1976 | Eckhart ........................ | 303/40 |
| 4,480,663 A | * | 11/1984 | Bergemann et al. ..... | 137/627.5 |
| 4,817,660 A | * | 4/1989 | Deike et al. ............ | 137/115.19 |
| 5,129,712 A | * | 7/1992 | Feldmann et al. ............. | 303/15 |
| 5,365,791 A | | 11/1994 | Padula et al. | |
| 5,395,164 A | * | 3/1995 | Sulzye ........................ | 303/15 |
| 5,544,948 A | | 8/1996 | Schmidt et al. | |
| 5,704,693 A | | 1/1998 | Mackiewicz | |
| 5,831,232 A | | 11/1998 | Kushnir et al. | |
| 6,053,205 A | | 4/2000 | Feldmann | |
| 6,158,468 A | | 12/2000 | Feldmann | |
| 6,192,685 B1 | | 2/2001 | Bourlon et al. | |
| 6,233,932 B1 | * | 5/2001 | Heibel et al. ................. | 60/550 |
| 6,651,784 B1 | * | 11/2003 | Barbosa et al. ............ | 188/71.9 |

FOREIGN PATENT DOCUMENTS

| | | |
|---|---|---|
| DE | 11 16 084 | 5/1962 |
| DE | 11 51 745 | 2/1964 |
| DE | 24 25 449 A | 12/1975 |
| DE | 31 20 203 A1 | 12/1982 |
| DE | 37 15 148 A1 | 11/1988 |
| DE | 38 41749 A1 | 6/1990 |
| DE | 40 16 756 A1 | 11/1991 |
| DE | 42 36 045 A1 | 11/1993 |
| DE | 42 32 492 A1 | 3/1994 |
| DE | 44 17 184 A1 | 11/1995 |
| DE | 196 53 264 A1 | 6/1998 |
| DE | 197 01 069 A1 | 7/1998 |
| DE | 198 35 574 A1 | 2/2000 |
| EP | 1042 148 | 7/1999 |

* cited by examiner

*Primary Examiner*—Mariano Sy
(74) *Attorney, Agent, or Firm*—Kramer Levin Naftalis & Frankel LLP

(57) ABSTRACT

An actuating device for a brake unit of a vehicle EBS includes a tappet positioned in a housing of the brake unit for actuating a piston to operate a brake valve. A displacement sensor slide measures axial movement of the tappet. So that moving parts of the actuating device are guided with minimal friction and that torque acting on the tappet is compensated for, the tappet includes a cylindrical attachment having a bottom with holes and a shell, a groove on the outer surface of the shell having openings, a spacer ring in the cylindrical attachment between the tappet and the piston having projections which extend into the holes, a guide ring in the groove having raised portions on its inner surface which extend into the openings and a window on its outer surface protruding through an opening into a slit on the housing to receive the displacement sensor slide.

7 Claims, 4 Drawing Sheets

US 6,866,346 B2

ACTUATING DEVICE FOR A BRAKE UNIT OF AN ELECTRONICALLY CONTROLLED VEHICLE BRAKE SYSTEM

BACKGROUND OF THE INVENTION

The present invention is directed generally to an actuating device for a brake unit of an electronically controlled vehicle brake system.

A typical electronically controlled vehicle brake system (EBS) is equipped with a purely pneumatic single circuit and with an electropneumatic circuit. The electropneumatic circuit includes, among other elements, an electronic control unit (ECU) and a brake signal transmitter with an integrated set value sensor designed as a displacement sensor, brake switch and proportional relay valve. The brake signal transmitter is connected mechanically to the vehicle brake pedal and electrically to the ECU. The brake signal transmitter (i.e., the brake unit) is provided with a tappet mechanically connected to the brake pedal and disposed in axially displaceable relationship inside the housing of the EBS brake unit. The tappet actuates a piston via a component that introduces some lost motion (i.e., idling stroke) and a spring braced against the piston and against the component. The piston operates a brake valve. The idling stroke (about 2 mm) is provided to ensure that the vehicle driver has some margin during brake actuation and does not instantly actuate the vehicle brakes. The tappet movement is communicated to the ECU by the displacement sensor, which is provided with one part in fixed position in the housing and with a slide that can move in axial direction together with the tappet, the slide engaging receiving means of the tappet.

Difficulties can arise in guiding the tappet and the component that introduces the idling stroke in such a way that minimizes friction. When the brake pedal is actuated, the tappet is exposed to not only an axial force, but also a torque which causes the tappet to twist around its longitudinal axis, especially when the mechanical connection to the brake pedal is a ball-and-socket joint. Under these conditions, the slide of the displacement sensor might slip out of its receiving means in the tappet or become damaged, thus making displacement sensing impossible or ineffective.

Accordingly, it is desired to provide an actuating device of the type under discussion in which the moving parts are guided with sufficiently low friction and any torque acting on the tappet is compensated for.

SUMMARY OF THE INVENTION

Generally speaking, in accordance with the present invention, an actuating device is provided which avoids the disadvantages of prior art actuating devices.

An actuating device is provided for use in a brake unit of a vehicle EBS. The actuating device includes a tappet which is axially movable in a brake unit housing and mechanically connected to the vehicle brake pedal, a piston actuated by the tappet for controlling a brake valve, and a displacement sensor slide movable with the tappet for determining the axial movement of the tappet. To guide the moving parts of the actuating device with sufficiently low friction and to compensate for any torque acting on the tappet, the tappet includes in axial direction a widened cylindrical attachment having a jacket or shell and a bottom. The cylinder bottom includes spaced-apart holes. The outer surface of the cylinder shell includes a radial circumferential groove including openings corresponding in height to the spaced-apart holes. A spacer ring disposed inside the cylindrical attachment of the tappet between the tappet and the piston provides a preselected amount of lost motion (i.e., idling stroke) to ensure that the vehicle driver has some margin during brake actuation and does not instantly actuate the vehicle brakes. The spacer ring includes tongues extending therefrom into the spaced-apart holes. A guide ring is disposed in the groove. The inner surface of the guide ring includes raised portions which extend into the openings. The outer surface of the guide ring includes a window protruding radially outwardly through one of the openings in the groove and into a guide slit defined in the housing for receiving an end of the displacement sensor slide.

Accordingly, it is an object of the present invention to provide an actuating device for a brake unit of a vehicle EBS constructed and arranged such that its moving parts are guided with minimal friction and that torque acting on the tappet is compensated for.

It is another object of the present invention to provide an actuating device that is cost effective to manufacture and assemble.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
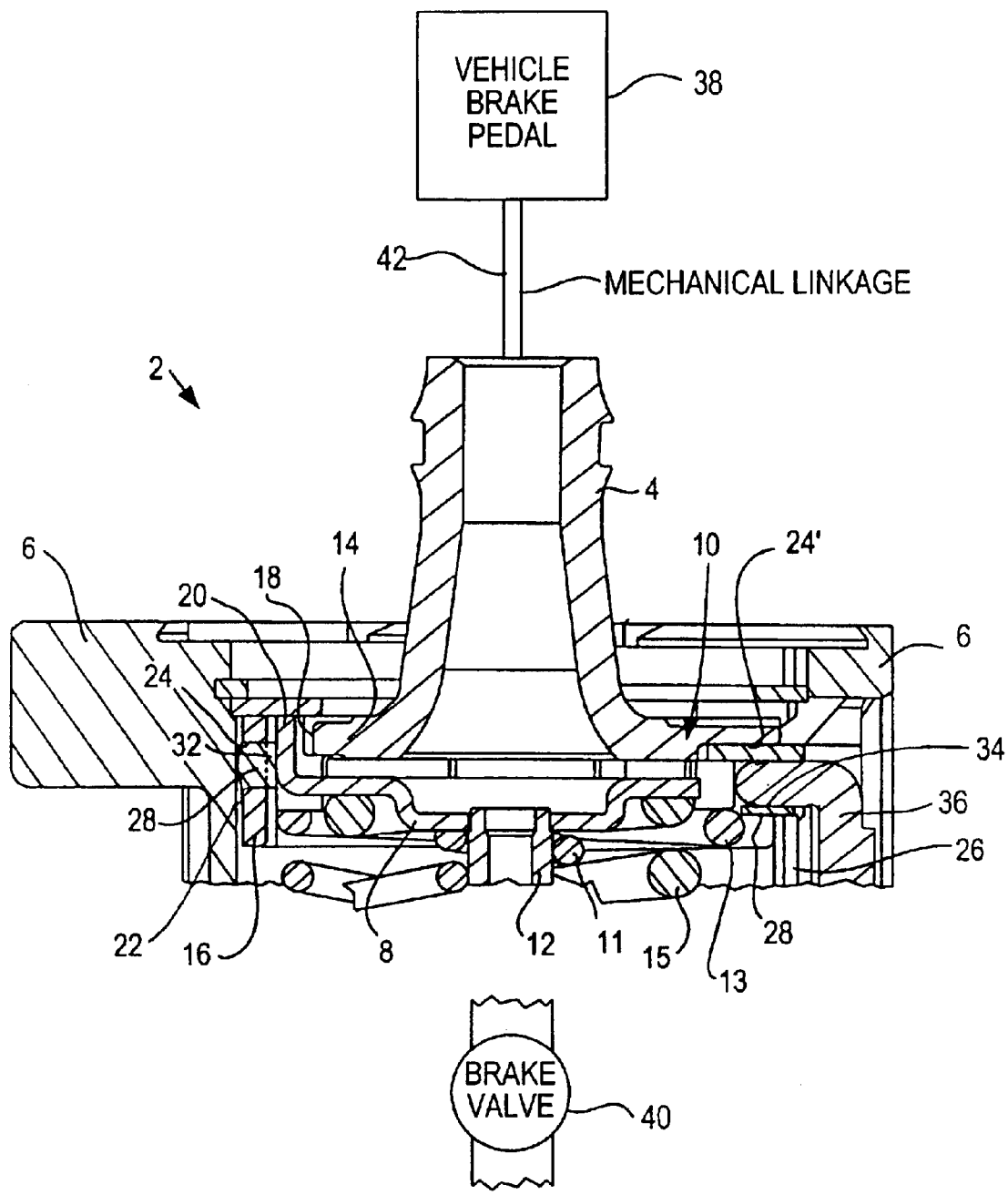
FIG. 1 is a cross-sectional view of an actuating device for a brake unit of a vehicle EBS constructed in accordance with a preferred embodiment of the present invention.
Figure 2:
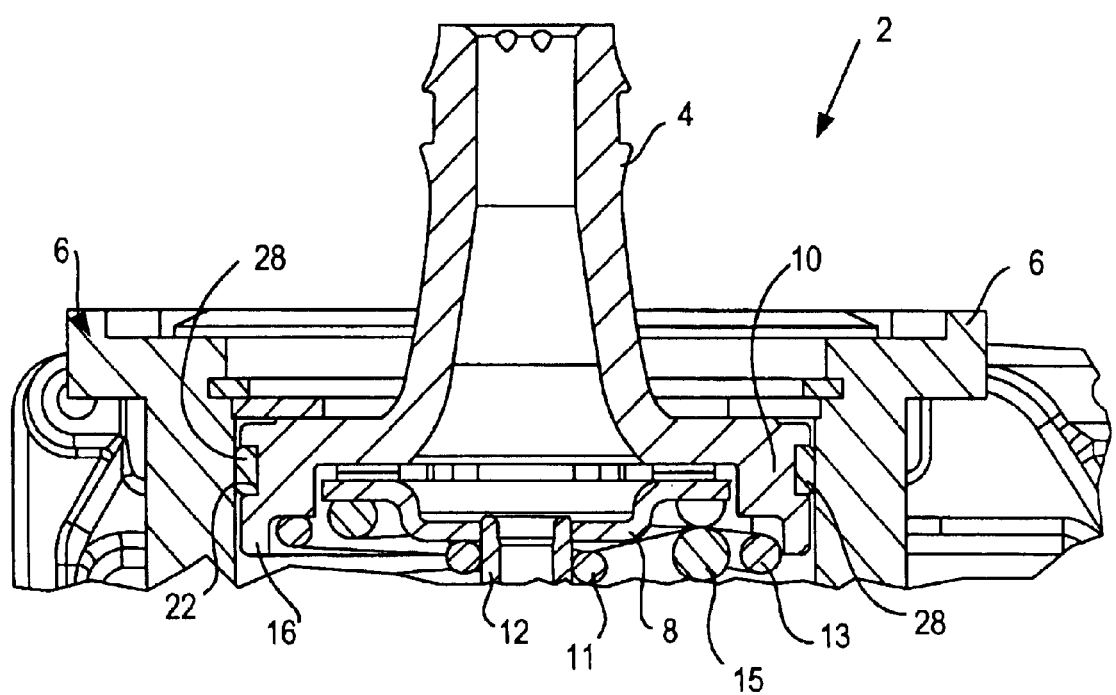
FIG. 2 is another cross-sectional view of the inventive actuating device depicted in FIG. 1.
Figure 3:
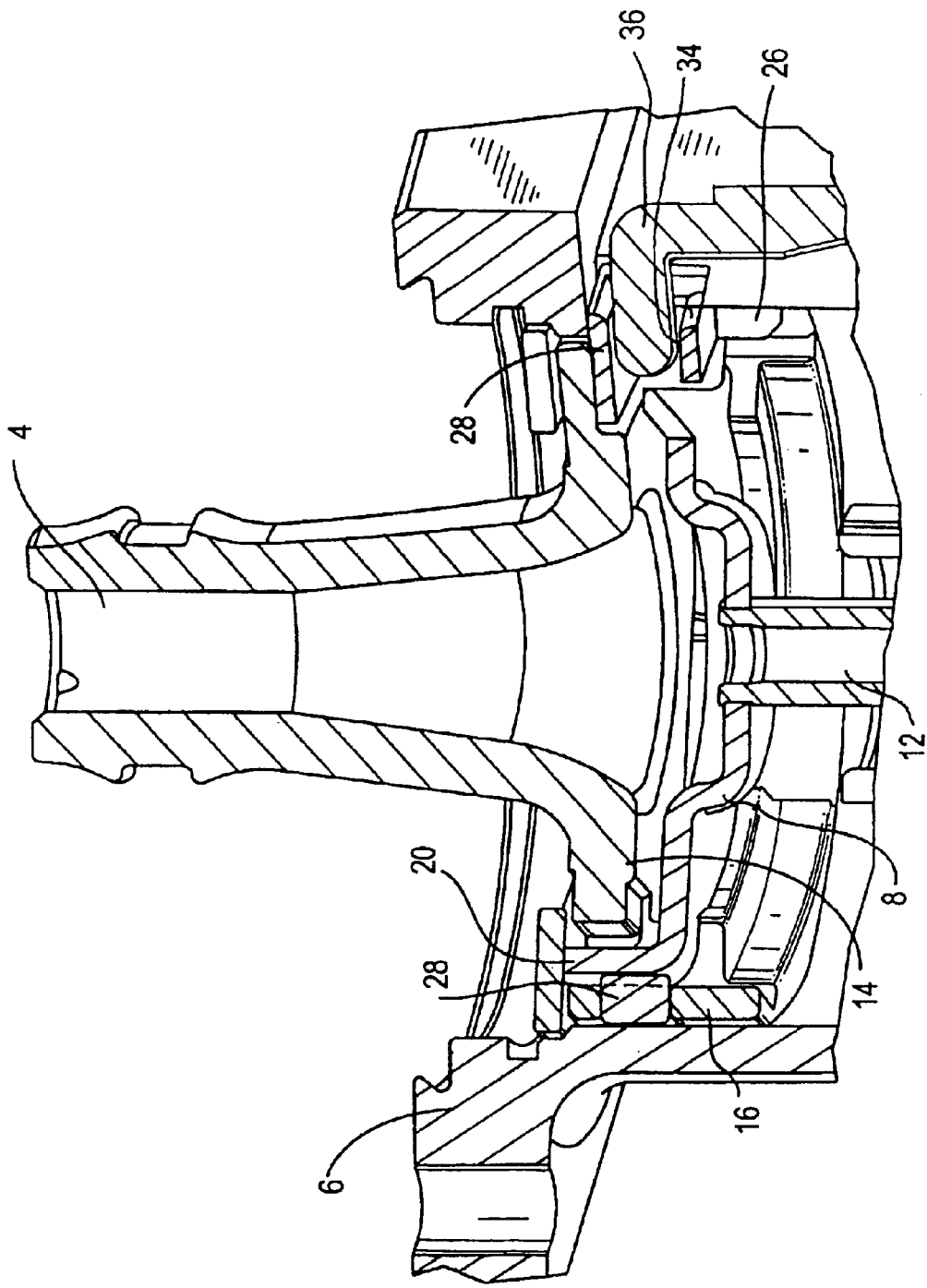
FIG. 3 is a rotated sectional view in three dimensions of the inventive actuating device depicted in FIGS. 1 and 2.

Referring now to the drawing figures where like reference numerals are used for corresponding parts, FIGS. 1–3 show various sectional views of an actuating device 2 of a brake unit of an EBS constructed in accordance with the present invention. Actuating device 2 includes a tappet 4, which is axially displaceable in a housing 6 and can be actuated by the vehicle brake pedal 38 via a mechanical linkage 42. Actuating device 2 further includes a spacer ring 8 which is axially displaceable in a widened cylindrical attachment 10 of tappet 4. A piston 12 is provided which can be moved axially by tappet 4 via spacer ring 8 (which makes a slight idling stroke) and a graduating spring 11 braced against piston 12 and against spacer ring 8. The piston 12 is actuated by tannet 4 for controlling brake valve 40. An outer return spring 13, braced against tappet 4 and against a stop, and a feeling spring 15, braced against spacer ring 8 and against a stop, are integral with the housing.

Cylindrical attachment 10 of tappet 4 includes an annular cylinder bottom 14 and a cylinder shell 16. A plurality of spaced-apart oblong holes 18 are formed in cylinder bottom 14. Spacer ring 8 includes a plurality of tongues 20 which extend into holes 18.

Cylinder shell 16 is provided on its outer circumference with a radially oriented circumferential groove 22. Openings 24 are formed at the bottom of groove 22 at the same height as holes 18. One opening 24' is aligned with a guide slit 26 formed in housing 6 in order to receive and guide a displacement sensor slide 36. Opening 24' preferably is larger than other of openings 24.

Figure 4:
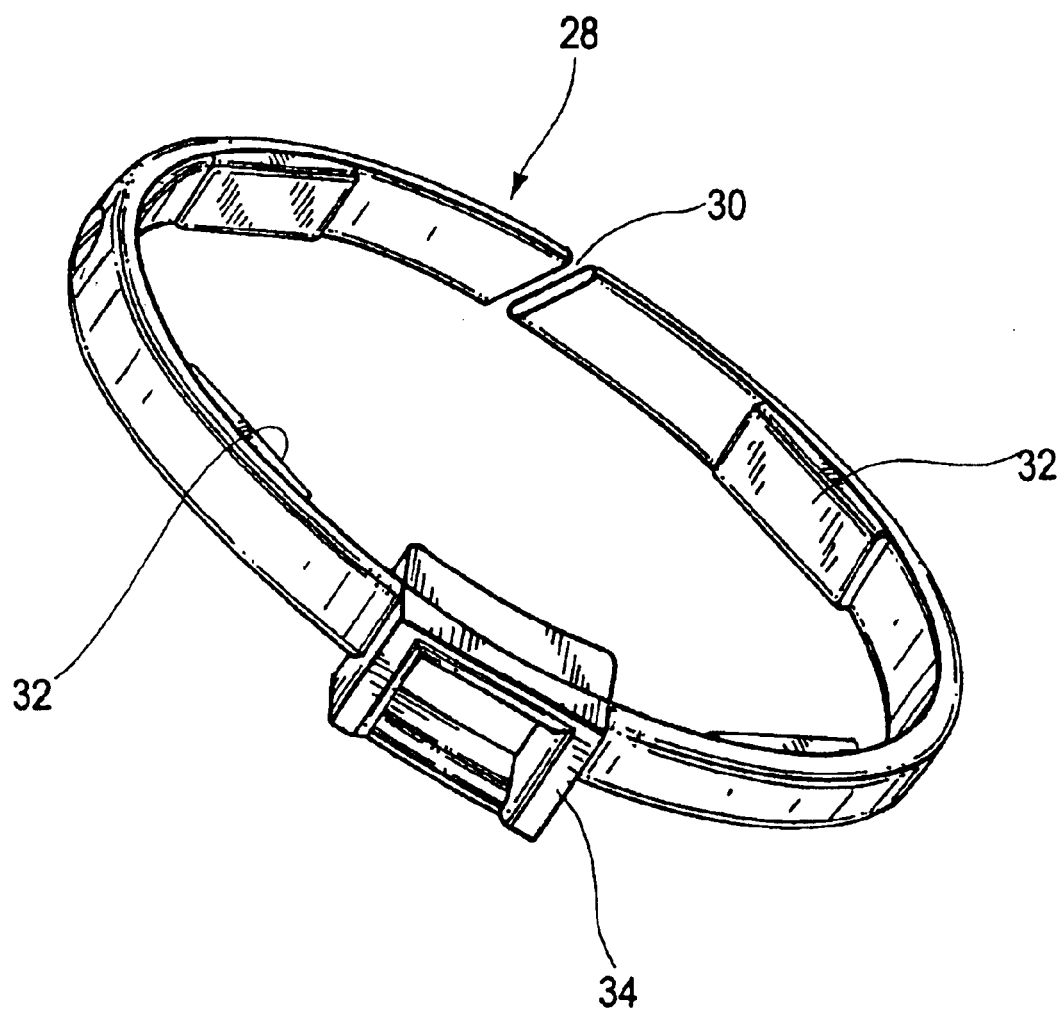
FIG. 4 is a perspective view of a guide ring employed in the actuating device constructed in accordance with a preferred embodiment of the present invention.

A guide ring 28, best depicted in FIG. 4, is inserted in the manner of a piston ring in groove 22. Guide ring 28 is provided with a disconnection point 30 by which the guide ring can be spread apart and pushed over cylinder shell 16 for installation on tappet 4. By virtue of spring action, guide ring 28 automatically snaps into groove 22 when it reaches installation position.

On its inner circumference, guide ring 28 is provided with raised portions 32 which extend into openings 24. The outside circumference of guide ring 28 is provided at one position with an outwardly protruding window 34 which extends through opening 24' into guide slit 26 of housing 6 and receives the end of the displacement sensor slide 36.

The thickness of guide ring 28 in radial direction between raised portions 32 is somewhat larger than the depth of groove 22 of tappet 4. The thickness of guide ring 28 in the region of raised portions 32 is larger than the wall thickness of cylinder shell 16 of tappet 4, thus ensuring that raised portions 32 protrude slightly through openings 24 into the interior space of cylinder shell 16.

The described construction of guide ring 28, of tappet 4 and of spacer ring 8 ensures that guide ring 28 not only guides the tappet relative to housing 6, via external contact in the region of cylinder shell 16, but also guides spacer ring 8, in the region of its tongues 20, in the inside of cylinder shell 16 of tappet 4, via contact with the outer sides of tongues 20. Window 34 prevents tappet 4 from twisting and thus ensures disturbance-free linking of the displacement sensor slide 36 to the tappet.

Tappet 4 and housing 6 are preferably formed from cast aluminum. Spacer ring 8 is preferably formed from steel. Guide ring 28 is preferably formed from plastic or like material.

Accordingly, the present invention provides an improved actuating device for a brake unit of an EBS having a single guide ring which can be clamped onto the tappet and which, by interaction with associated structure on the tappet and on the spacer ring, axially guides the outside part of the tappet in the housing and the spacer ring in the inside of the tappet in order to achieve some lost motion (i.e., idling stroke), while simultaneously minimizing friction and eliminating undesired twisting of the tappet about its longitudinal axis to ensure linking of the displacement sensor slide to the tappet. All desired functions are achieved by the invention with only a single component, thus reducing manufacturing, assembly and labor costs. The construction of the tappet can be simplified.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An actuating device for a brake unit of an electronically controlled vehicle brake system, the actuating device comprising a tappet constructed and arranged (i) for positioning in axially displaceable relationship in a housing of the brake unit of the electronically controlled brake system of a vehicle, (ii) for actuating a piston to operate a brake valve of said brake unit, and (iii) for mechanical connection to a brake pedal of said vehicle, said tappet including in axial direction a cylindrical attachment having a shell and a bottom, said bottom including a plurality of spaced-apart holes, said shell having an outer surface including a radial circumferential groove defined thereon, said groove including openings corresponding substantially in height to said spaced-apart holes, a displacement sensor slide movable with said tappet for measuring axial movement of said tappet, a spacer ring disposed inside said cylindrical attachment of said tappet between said tappet and said piston for providing a preselected amount of lost motion, said spacer ring including a plurality of tongues extending therefrom into said spaced-apart holes, and a guide ring disposed in said groove, said guide ring having an inner surface including raised portions which extend into said openings and an outer surface including a window protruding radially outwardly through an individual one of said openings in said groove and into a guide slit defined in said housing for receiving an end of said displacement sensor slide.

2. The actuating device according to claim 1, wherein said guide ring has a thickness between said raised portions greater than a depth of said groove of said tappet.

3. The actuating device according to claim 1, wherein said raised portions of said guide ring have a thickness greater than a thickness of said shell of said cylindrical attachment of said tappet so that said raised portions protrude through said openings into said shell.

4. The actuating device according to claim 1, wherein said guide ring is constructed arid arranged to be clamped elastically onto said shell of said cylindrical attachment of said tappet.

5. The actuating device according to claim 1, wherein said guide ring includes a disconnection point.

6. The actuating device according to claim 1, wherein said guide ring is formed from plastic.

7. The actuating device according to claim 1, wherein said spaced-apart holes are oblong in shape.

* * * * *